(12) United States Patent
Liu et al.

(10) Patent No.: US 10,609,710 B2
(45) Date of Patent: Mar. 31, 2020

(54) METHOD FOR TRANSMITTING RADIO RESOURCE CONTROL MESSAGE, CENTRAL UNIT AND DISTRIBUTED UNIT

(71) Applicant: CHINA ACADEMY OF TELECOMMUNICATIONS TECHNOLOGY, Beijing (CN)

(72) Inventors: Aijuan Liu, Beijing (CN); Dajun Zhang, Beijing (CN); Fangli Xu, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 16/476,059

(22) PCT Filed: Feb. 14, 2018

(86) PCT No.: PCT/CN2018/076817
§ 371 (c)(1),
(2) Date: Jul. 3, 2019

(87) PCT Pub. No.: WO2018/127246
PCT Pub. Date: Jul. 12, 2018

(65) Prior Publication Data
US 2019/0357209 A1    Nov. 21, 2019

(30) Foreign Application Priority Data
Jan. 6, 2017 (CN) .......................... 2017 1 0010278

(51) Int. Cl.
*H04J 3/00* (2006.01)
*H04W 72/04* (2009.01)
(Continued)

(52) U.S. Cl.
CPC ..... *H04W 72/0446* (2013.01); *H04L 12/4633* (2013.01); *H04W 76/11* (2018.02)

(58) Field of Classification Search
None
See application file for complete search history.

(56) References Cited

U.S. PATENT DOCUMENTS

| 2009/0023453 A1* | 1/2009 | Hu ........................ H04W 48/17 455/452.1 |
| 2012/0093070 A1* | 4/2012 | Huang ................ H04B 7/2606 370/315 |

(Continued)

FOREIGN PATENT DOCUMENTS

| CN | 105519167 A | 4/2016 |
| CN | 106162730 A | 11/2016 |

(Continued)

OTHER PUBLICATIONS

International Search Report issued for PCT/CN2018/076817 dated May 2, 2018.

(Continued)

*Primary Examiner* — Gerald A Smarth
(74) *Attorney, Agent, or Firm* — Ladas & Parry LLP

(57) ABSTRACT

A method for transmitting a radio resource control message, a network side central unit, and a network side distributed unit are provided. The method for transmitting a radio resource control (RRC) message includes: mapping the radio resource control (RRC) message into a data stream of a level corresponding to a user plane; and sending effective time and a logical channel identifier of the RRC message and the data stream to a corresponding network side distributed unit (DU) through the user plane or a control plane.

20 Claims, 5 Drawing Sheets

(51) Int. Cl.
*H04L 12/46* (2006.01)
*H04W 76/11* (2018.01)

(56) References Cited

U.S. PATENT DOCUMENTS

| | | |
|---|---|---|
| 2014/0161058 A1 | 6/2014 | Sundaresan |
| 2015/0350938 A1* | 12/2015 | Heikkila ............... H04W 24/08 370/252 |
| 2016/0219475 A1 | 7/2016 | Kim |
| 2018/0279229 A1* | 9/2018 | Dinan ................. H04W 52/146 |

FOREIGN PATENT DOCUMENTS

| | | |
|---|---|---|
| EP | 2381726 A1 | 10/2011 |
| EP | 3107220 A1 | 12/2016 |

OTHER PUBLICATIONS

Written Opinion of the International Searching Authority issued for PCT/CN2018/076817 dated May 2, 2018.
"3rd Generation Partnership Project; Technical Specification Group Radio Access Network; Study on New Radio Access Technology; Radio Access Architecture and Interfaces," 3GPP TR 38.801 V1.0.0 (Dec. 2016).
ZTE, "Clarification on the requirement for CP/UP separation," 3GPP TSG RAN WG2 meeting #93bis, R2-162613, Apr. 15, 2016.
First office action issued for Chinese Application No. 201710010278.0 dated Dec. 29, 2018.

\* cited by examiner

METHOD FOR TRANSMITTING RADIO RESOURCE CONTROL MESSAGE, CENTRAL UNIT AND DISTRIBUTED UNIT

CROSS-REFERENCE TO RELATED APPLICATIONS

The present application is the U.S. national phase of PCT/CN2018/076817 filed on Feb. 14, 2018, which claims a priority to Chinese Patent Application No. 201710010278.0 filed in China on Jan. 6, 2017, the entire contents of which are incorporated herein by reference.

TECHNICAL FIELD

The present disclosure relates to the technical field of communications, and in particular, to a method for transmitting a radio resource control message, a network side central unit, and a network side distributed unit.

BACKGROUND

In a long-term evolution LTE (4G network) system, an evolved universal terrestrial radio access network (E-UTRAN) is composed of a plurality of base stations eNodeb, an eNodeB and an Evolved Packet Core (EPC, 4G core network) are connected through an S1 (between the base station and the packet core network EPC) interface, and the eNodeBs are connected through an X2 (inter-base station) interface. In a 5G system, upon consideration of introducing a central unit for centralized control and scheduling, a function of radio resource control (RRC) and a function of part of layers, i.e., layer 2 (data link layer) or/and layer 1 (physical layer), are deployed at the central node, and other functions of the base station are deployed at distribute units. The interface (NG) of the base station and the core network in the 5G network is terminated in the central unit (CU), and the interface (Xn) between the base stations is also terminated in the CU.

Possible ways of separating the central unit (CU)/distributed unit (DU) on the radio access network (RAN) side and the transport layer protocol of the current wired interface will be briefly described below.

1) RAN Side Architecture

Two possible 5G network deployment structures are provided below.

Deployment structure 1: base station+user equipment

Shown in FIG. 1 is a typical LTE architecture. There are multiple cells under an eNB. In a connected state, user equipment (UE) and the cell perform radio data transmission and reception.

Deployment structure 2: As shown in FIG. 2, the network side node is divided into a central unit (CU) and a distributed unit (DU), the user side node is a user equipment (UE), and information interaction is performed between the UE and the DU through transmission points TRP.

2) 5G Transport Layer Protocol of Wired Interface (NG, Xn)

Considering that an interface control signaling requires high reliability, the control plane adopts a Stream Control Transmission Protocol (SCTP), as shown in FIG. 3.

As shown in FIG. 4, the user plane mainly adopts a GTP-U protocol (point-to-point tunneling protocol), which, mainly considering the protocol specifications defined internally in 3GPP, is advantageous for compatibility with the original system. However, GTP-U does not guarantee reliable transmission.

3) Separation Between CU and DU on the RAN Side:

In the deployment architecture 2, the way of separating the CU from the DU on the RAN side needs to be taken into consideration. Currently, there are 8 possible options, as shown in FIG. 5:

Option 1: RRC in the CU; packet data convergence protocol PDCP, radio link control protocol RLC, medium access control protocol MAC, physical layer, and radio frequency RF in the DU;

Option 2: RRC, and PDCP in the CU; RLC, MAC, physical layer, and RF in the DU;

Option 3: RRC, PDCP, and RLC high layer (High-RLC, RLC-H) in the CU; RLC low layer (Low-RLC, RLC-L), MAC, physical layer, and RF in the DU;

Option 4: RRC, PDCP, and RLC in the CU; MAC, physical layer, and RF in the DU;

Option 5: RRC, PDCP, RLC, and MAC high layer (High-MAC) in the CU; MAC low layer (Low-MAC), physical layer, and RF in the DU;

Option 6: RRC, PDCP, RLC, and MAC in the CU; physical layer and RF in the DU;

Option 7: RRC, PDCP, RLC, MAC, and part of physical layer (high layer of physical layer, High-PHY) in the CU; low layer of physical layer (Low-PHY) and RF in the DU;

Option 8: RRC, PDCP, RLC, MAC and physical layer in the CU; RF in the DU.

However, as for the above solutions for separation of the CU from the DU, the related art does not address how the data stream corresponding to the RRC message is transmitted through the interface between the CU and the DU, so that the data cannot be correctly transmitted.

SUMMARY

The present disclosure is to provide a method for transmitting a radio resource control (RRC) message, a network side central unit (CU), and a network side distributed unit (DU), for solving the problem that the RRC message cannot be correctly transmitted in the case where the CU is separated from the DU in a 5G system in the related art.

In order to solve the above technical problem, some embodiments of the present disclosure provide a method for transmitting a radio resource control (RRC) message, applied to a network side central unit (CU), including:

mapping the radio resource control (RRC) message into a data stream of a level corresponding to a user plane; and sending effective time and a logical channel identifier of the RRC message and the data stream to a corresponding network side distributed unit (DU) through the user plane or a control plane.

Optionally, the step of sending effective time and a logical channel identifier of the RRC message and the data stream to a corresponding network side distributed unit (DU) through the user plane includes:

adding the effective time and the logical channel identifier of the RRC message in a point-to-point tunneling protocol GTP-U header; and sending the GTP-U header and the data stream to the corresponding network side distributed unit (DU) through the user plane.

Optionally, the step of sending effective time and a logical channel identifier of the RRC message and the data stream to a corresponding network side distributed unit (DU) through a control plane includes:

sending the data stream to an interface application protocol layer (AP) between the CU and the DU;

assembling an interface message including the effective time and the logical channel identifier of the RRC message and the data stream by the interface AP; and sending the interface message to the corresponding network side distributed unit (DU) through the control plane.

Optionally, the step of assembling an interface message including the effective time and the logical channel identifier of the RRC message and the data stream by the interface AP includes:

incorporating the data stream in the interface message, in the form of a container.

Optionally, the step of mapping the radio resource control (RRC) message into a data stream of a level corresponding to a user plane includes:

sending the RRC message to a corresponding packet data convergence protocol (PDCP) entity; and generating, with the PDCP entity, PDCP layer protocol data corresponding to the RRC message, wherein the data stream is formed by the PDCP layer protocol data.

Optionally, the step of mapping the radio resource control (RRC) message into a data stream of a level corresponding to a user plane includes:

sending the RRC message to a corresponding packet data convergence protocol (PDCP) entity;

generating, with the PDCP entity, PDCP layer protocol data corresponding to the RRC message;

sending the PDCP layer protocol data to a corresponding radio link control protocol (RLC) high layer entity; and generating, with the RLC high layer entity, RLC layer protocol data corresponding to the PDCP layer protocol data, wherein the data stream is formed by the RLC layer protocol data.

The present disclosure further provides a method for transmitting a radio resource control (RRC) message, applied to a network side distributed unit (DU), including:

receiving effective time and a logical channel identifier of the RRC message and a data stream sent by a network side central unit (CU); and sending the data stream to a corresponding user equipment according to the effective time and the logical channel identifier.

Optionally, the step of receiving effective time and a logical channel identifier of the RRC message and a data stream sent by a network side central unit (CU) includes:

receiving a point-to-point tunneling protocol GTP-U header and the data stream sent by the CU through a user plane, wherein the GTP-U header includes the effective time and the logical channel identifier of the RRC message.

Optionally, the step of receiving effective time and a logical channel identifier of the RRC message and a data stream sent by a network side central unit (CU) includes:

receiving an interface application protocol layer (AP) message between the CU and the DU sent by the CU through a control plane, wherein the interface AP message includes the effective time and the logical channel identifier of the RRC message and the data stream.

Optionally, the step of sending the data stream to a corresponding user equipment according to the effective time and the logical channel identifier includes:

sending the data stream to a corresponding entity for preset processing; and sending the processed data stream to the corresponding user equipment according to the effective time and the logical channel identifier.

Optionally, when the data stream is formed by packet data convergence protocol (PDCP) layer protocol data, the step of sending the data stream to a corresponding entity for preset processing includes:

sending the data stream to a corresponding radio link control protocol (RLC) entity, and obtaining the processed data stream through a medium access control protocol (MAC) layer, a physical layer and radio frequency processing.

Optionally, when the data stream is formed by radio link control protocol (RLC) layer protocol data, the step of sending the data stream to a corresponding entity for preset processing includes:

sending the data stream to a corresponding RLC low layer entity, and obtaining the processed data stream through a medium access control protocol (MAC) layer, a physical layer and radio frequency processing.

The present disclosure also provides a network side central unit (CU), including:

a first processing module configured to map a radio resource control (RRC) message into a data stream of a level corresponding to a user plane; and a first sending module configured to send effective time and a logical channel identifier of the RRC message and the data stream to a corresponding network side distributed unit (DU) through the user plane or a control plane.

Optionally, the first sending module includes:

a first adding submodule configured to add the effective time and the logical channel identifier of the RRC message in a point-to-point tunneling protocol GTP-U header; and a first sending submodule configured to send the GTP-U header and the data stream to the corresponding network side distributed unit (DU) through the user plane.

Optionally, the first sending module includes:

a second sending submodule, configured to send the data stream to an interface application protocol layer (AP) between the CU and the DU;

a first assembling submodule configured to assemble, with the interface AP, an interface message including the effective time and the logical channel identifier of the RRC message and the data stream; and a third sending submodule, configured to send the interface message to the corresponding network side distributed unit (DU) through the control plane.

Optionally, the first assembling submodule includes:

a first processing unit configured to incorporate the data stream in the interface message, in the form of a container.

Optionally, the first processing module includes:

a fourth sending submodule configured to send the RRC message to a corresponding packet data convergence protocol (PDCP) entity; and a first processing submodule configured to generate, with the PDCP entity, PDCP layer protocol data corresponding to the RRC message, wherein the data stream is formed by the PDCP layer protocol data.

Optionally, the first processing module includes:

a fifth sending submodule configured to send the RRC message to a corresponding packet data convergence protocol PDCP entity;

a second processing submodule configured to generate, with the PDCP entity, PDCP layer protocol data corresponding to the RRC message;

a sixth sending submodule configured to send the PDCP layer protocol data to a corresponding radio link control protocol (RLC) high layer entity; and a third processing submodule configured to generate, with the RLC high layer entity, RLC layer protocol data corresponding to the PDCP layer protocol data, wherein the data stream is formed by the RLC layer protocol data.

The present disclosure also provides a network side distributed unit (DU), including:

a first receiving module configured to receive effective time and a logical channel identifier of a RRC message and a data stream sent by a network side central unit (CU); and a second sending module configured to send the data stream to a corresponding user equipment according to the effective time and the logical channel identifier.

Optionally, the first receiving module includes:

a first receiving submodule configured to receive a point-to-point tunneling protocol GTP-U header and the data stream sent by the CU through a user plane, wherein the GTP-U header includes the effective time and the logical channel identifier of the RRC message.

Optionally, the first receiving module includes:

a second receiving submodule configured to receive an interface application protocol layer (AP) message between the CU and the DU sent by the CU through a control plane, wherein the interface AP message includes the effective time and the logical channel identifier of the RRC message and the data stream.

Optionally, the second sending module includes:

a seventh sending submodule configured to send the data stream to a corresponding entity for preset processing; and an eighth sending submodule configured to send the processed data stream to the corresponding user equipment according to the effective time and the logical channel identifier.

Optionally, when the data stream is formed by packet data convergence protocol (PDCP) layer protocol data, the seventh sending submodule includes:

a second processing unit configured to send the data stream to a corresponding radio link control protocol (RLC) entity, and obtain the processed data stream through a medium access control protocol (MAC) layer, a physical layer, and radio frequency processing.

Optionally, wherein when the data stream is formed by radio link control protocol (RLC) layer protocol data, the seventh sending submodule includes:

a third processing unit configured to send the data stream to a corresponding RLC low layer entity, and obtain the processed data stream through a medium access control protocol (MAC) layer, a physical layer, and radio frequency processing.

The present disclosure also provides a network side central unit (CU), including a processor, a transceiver, and a memory;

wherein the processor is configured to read a program in the memory to perform the following process:

mapping a radio resource control (RRC) message into a data stream of a level corresponding to a user plane;

sending effective time and a logical channel identifier of the RRC message and the data stream to a corresponding network side distributed unit (DU) through the user plane or a control plane;

the transceiver is configured to receive and transmit data; and the memory is configured to store data used by the processor when performing operations.

The present disclosure also provides a network side distributed unit (DU), including a processor, a transceiver, and a memory;

wherein the processor is configured to read a program in the memory to perform the following process:

receiving effective time and a logical channel identifier of the RRC message and a data stream sent by a network side central unit (CU);

sending the data stream to a corresponding user equipment according to the effective time and the logical channel identifier;

the transceiver is configured to receive and transmit data; and the memory is configured to store data used by the processor when performing operations.

The above technical solutions of the present disclosure bring about the following advantageous effects:

in the method for transmitting the radio resource control (RRC) message in the above solution, the radio resource control (RRC) message is mapped into the data stream of a level corresponding to the user plane, and the effective time and the logical channel identifier of the RRC message and the data s earn are sent to the corresponding network side distributed unit (DU) through the user plane or a control plane. As such, the transmission mode of the RRC message in the architecture where the CU and the DU are separated is specified in the 5G system, thereby ensuring correct data transmission.

DETAILED DESCRIPTION

The technical problems, technical solutions, and advantages of the present disclosure will be described more clearly below in connection with the accompanying drawings and specific embodiments.

Figure 1:
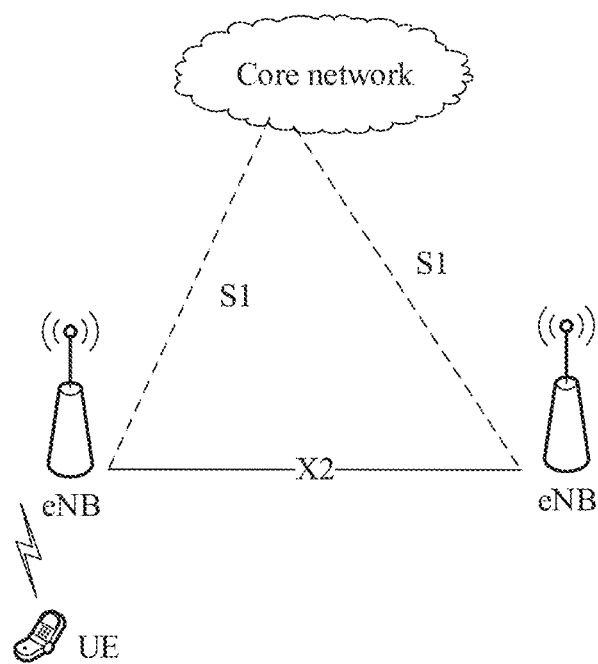
FIG. 1 is a schematic diagram I of RAN side architecture deployment in the related art.
Figure 2:
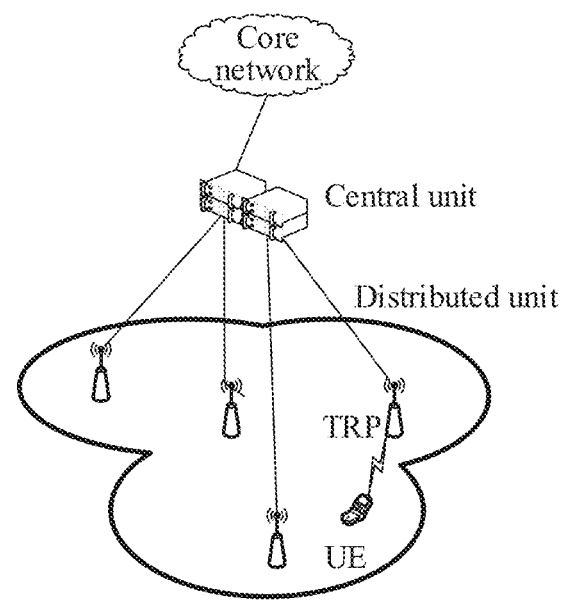
FIG. 2 is a schematic diagram II of RAN side architecture deployment in the related art.
Figure 3:
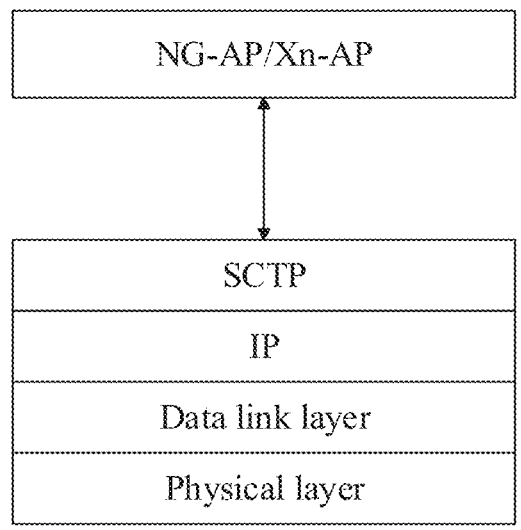
FIG. 3 is a schematic diagram of a transport layer control plane protocol stack of a wired interface in a 5G network in the related art.
Figure 4:
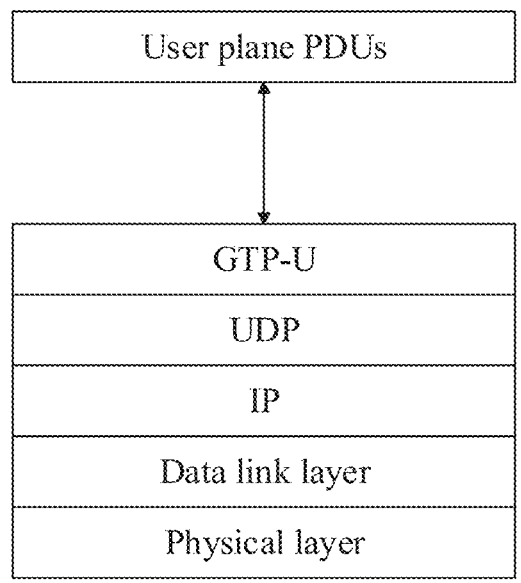
FIG. 4 is a schematic diagram of a transport layer user plane protocol stack of a wired interface in a 5G network in the related art.
Figure 5:
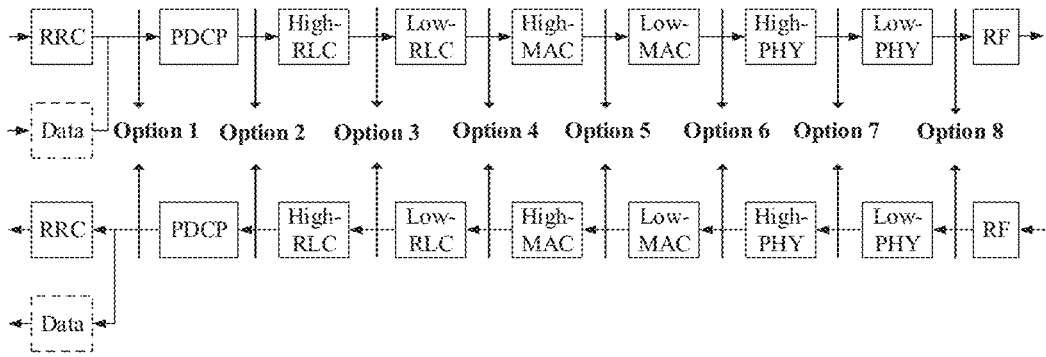
FIG. 5 is a schematic diagram of a separation manner between a CU and a DU on the RAN side according to the architecture deployment shown in FIG. 2.
Figure 6:
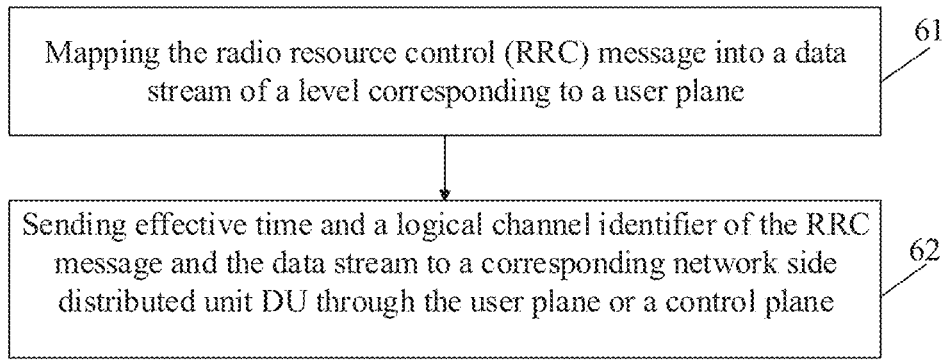
FIG. 6 is a schematic diagram showing a flowchart of a method for transmitting a radio resource control (RRC) message according to some embodiments of the present disclosure.

The present disclosure provides a plurality of solutions for the problem that a radio resource control (RRC) message cannot be correctly transmitted in the case where a central unit (CU) is separated from a distributed unit (DU) in a 5G system in the related art, specifically as follows:

As shown in FIG. 6, some embodiments of the present disclosure provides a method for transmitting a radio resource control (RRC) message, which may be applied to a network side central unit (CU), including:

Step 61: mapping the radio resource control (RRC) message into a data stream of a level corresponding to a user plane; and Step 62: sending effective time and a logical channel identifier of the RRC message and the data stream to a corresponding network side distributed unit (DU) through the user plane or a control plane.

In the method for transmitting the radio resource control (RRC) message provided in some embodiments of the present disclosure, the radio resource control (RRC) message is mapped into the data stream of a level corresponding to the user plane, and the effective time and the logical channel identifier of the RRC message and the data stream are sent to the corresponding network side distributed unit (DU) through the user plane or a control plane. As such, the transmission mode of the RRC message in the architecture where the CU and the DU are separated is specified in the 5G system, thereby ensuring correct data transmission.

Two specific solutions are provided for the transmission through a user plane and a control plane respectively.

As a first solution, with respect to the transmission through the user plane, the step of sending effective time and a logical channel identifier of the RRC message and the data stream to a corresponding network side distributed unit (DU) through the user plane includes: adding the effective time and the logical channel identifier of the RRC message in a point-to-point tunneling protocol GTP-U header; and sending the GTP-U header and the data stream to the corresponding network side distributed unit (DU) through the user plane.

As a second solution, with respect to the transmission through the control plane, the step of sending effective time and a logical channel identifier of the RRC message and the data stream to a corresponding network side distributed unit (DU) through a control plane includes: sending the data stream to an interface application protocol layer (AP) between the CU and the DU; assembling an interface message including the effective time and the logical channel identifier of the RRC message and the data stream by the interface AP; and sending the interface message to the corresponding network side distributed unit (DU) through the control plane.

Specifically, the step of assembling an interface message including the effective time and the logical channel identifier of the RRC message and the data stream by the interface AP includes: incorporating the data stream in the interface message, in the form of a container.

With respect to various instances where the DC is separated from the CU, some embodiments of the present disclosure provides two specific solutions with respect to Step 61:

As a first solution, in the case where the RRC and the PDCP are in the CU, and the RLC, the MAC, the physical layer and the RF are in the DU, the step of mapping the radio resource control (RRC) message into a data stream of a level corresponding to a user plane includes: sending the RRC message to a corresponding packet data convergence protocol (PDCP) entity; and generating, with the PDCP entity, PDCP layer protocol data corresponding to the RRC message, wherein the data stream is formed by the PDCP layer protocol data.

As a second solution, in the case where the RRC, the PDCP and the high layer of the RLC are in the CU, and the low layer of the RLC, the MAC, the physical layer and the RF are in the DU, the step of mapping the radio resource control (RRC) message into a data stream of a level corresponding to a user plane includes: sending the RRC message to a corresponding packet data convergence protocol (PDCP) entity; generating, with the PDCP entity, PDCP layer protocol data corresponding to the RRC message; sending the PDCP layer protocol data to a corresponding radio link control protocol (RLC) high layer entity; and generating, with the RLC high layer entity, RLC layer protocol data corresponding to the PDCP layer protocol data, wherein the data stream is formed by the RLC layer protocol data.

Figure 7:
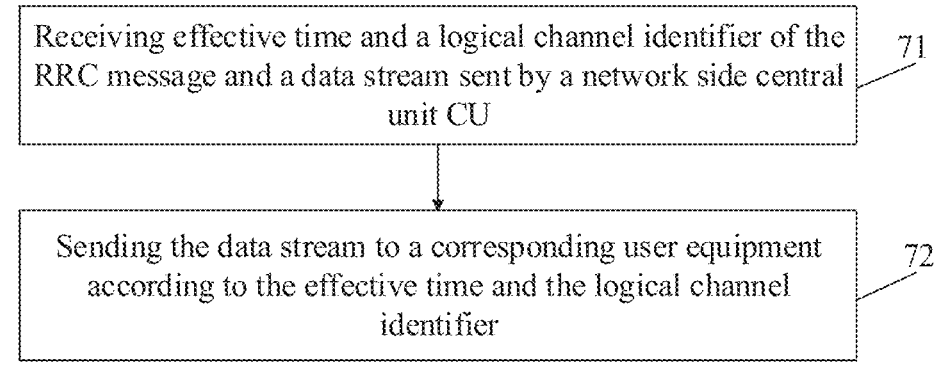
FIG. 7 is a schematic diagram showing a flowchart of a method for transmitting a radio resource control (RRC) message according to some embodiments of the present disclosure.

As can be known from the above, some embodiments of the present disclosure provide a solution for addressing how the RRC message is specifically transmitted in the case where the CU is separated from the DU in the 5G system, which guarantees correct data transmission, and solves the problem that the data cannot be correctly transmitted in the case where the CU is separated from the DU in the 5G system in the related art As shown in FIG. 7, some embodiments of the present disclosure provides a method for transmitting a radio resource control (RRC) message, which may be applied to a network side distributed unit (CU), including:

Step 71: receiving effective time and a logical channel identifier of the RRC message and a data stream sent by a network side central unit (CU); and Step 72: sending the data stream to a corresponding user equipment according to the effective time and the logical channel identifier.

In the method for transmitting the radio resource control (RRC) message provided in some embodiments of the present disclosure, effective time and a logical channel identifier of the RRC message and a data stream sent by a network side central unit (CU) are received, and the data stream to a corresponding user equipment is sent according to the effective time and the logical channel identifier. As such, the transmission mode of the RRC message in the architecture where the CU is separated from the DU is specified in the 5G system, thereby ensuring correct data transmission.

Two specific solutions are provided for the transmission through the user plane and the control plane respectively.

As a first solution, with respect to the transmission through the user plane, the step of receiving effective time and a logical channel identifier of the RRC message and a data stream sent by a network side central unit (CU) includes: receiving a point-to-point tunneling protocol GTP-U header and the data stream sent by the CU through a user plane, wherein the GTP-U header includes the effective time and the logical channel identifier of the RRC message.

As a second solution, with respect to the transmission through the control plane, the step of receiving effective time and a logical channel identifier of the RRC message and a data stream sent by a network side central unit (CU) includes: receiving an interface application protocol layer (AP) message between the CU and the DU sent by the CU through a control plane, wherein the interface AP message includes the effective time and the logical channel identifier of the RRC message and the data stream.

Specifically, the step of sending the data stream to a corresponding user equipment according to the effective time and the logical channel identifier includes: sending the data stream to a corresponding entity for preset processing; and sending the processed data stream to the corresponding user equipment according to the effective time and the logical channel identifier.

With respect to various instances where the DC is separated from the CU, some embodiments of the present disclosure provide two specific solutions for the step of "sending the data stream to a corresponding entity for preset processing":

As a first solution, in the case where the RRC and the PDCP are in the CU, and the RLC, the MAC, the physical layer and the RF are in the DU, that is, when the data stream is formed by packet data convergence protocol (PDCP) layer protocol data, the step of sending the data stream to a corresponding entity for preset processing includes: sending the data stream to a corresponding radio link control protocol (RLC) entity, and obtaining the processed data stream through a medium access control protocol (MAC) layer, a physical layer and radio frequency processing.

As a second solution, in the case where the RRC, the PDCP and the high layer of the RLC are in the CU, and the low layer of the RLC, the MAC, the physical layer and the RF are in the DU, that is, when the data stream is formed by radio link control protocol (RLC) layer protocol data, the step of sending the data stream to a corresponding entity for preset processing includes: sending the data stream to a corresponding RLC low layer entity, and obtaining the processed data stream through a medium access control protocol (MAC) layer, a physical layer and radio frequency processing.

As can be known from the above, some embodiments of the present disclosure provide a solution for addressing how the RRC message is specifically transmitted in the case where the CU is separated from the DU in the 5G system, which guarantees correct data transmission, and solves the problem that the data cannot be correctly transmitted in the case where the CU is separated from the DU in the 5G system in the related art.

The method for transmitting a RRC message provided by some embodiments of the present disclosure will be further described below with respect to the CU side and the DU side.

Solutions provided by some embodiments of the present disclosure are mainly directed to transmission of the RRC message between the network side and the UE in the architecture where the CU is separated from the DU in the 5G system, mainly considering how to transmit the RRC message through the interface between the CU and the DU in the scenario of the above Option 2 or the Option 3.

Generally, there are mainly two solutions:

The first solution is that the PDCP PDU (PDCP layer protocol data unit) or the RLC PDU (RLC layer protocol data unit) corresponding to the RRC message is transmitted through the user plane of the CU and the DU, and at the same time, the GTP-U (point-to-point tunneling protocol) header of the user plane protocol stack carries the transmission time and the logical channel identifier of the message.

Specifically, in the CU, the RRC message is mapped into the corresponding layer 2 data stream-PDCP data or RLC data (e.g., if the CU includes the RLC layer, the RRC message needs to generate the corresponding RLC PDU, and, if not, the PDCP PDU is generated).

The CU transmits the data stream through the user plane, and at the same time, the effective time and the logical channel identifier of the RRC message are added in the GTP-U header.

After receiving the data, the DU continues to process the data and send it to the UE at the corresponding time.

Figure 8:
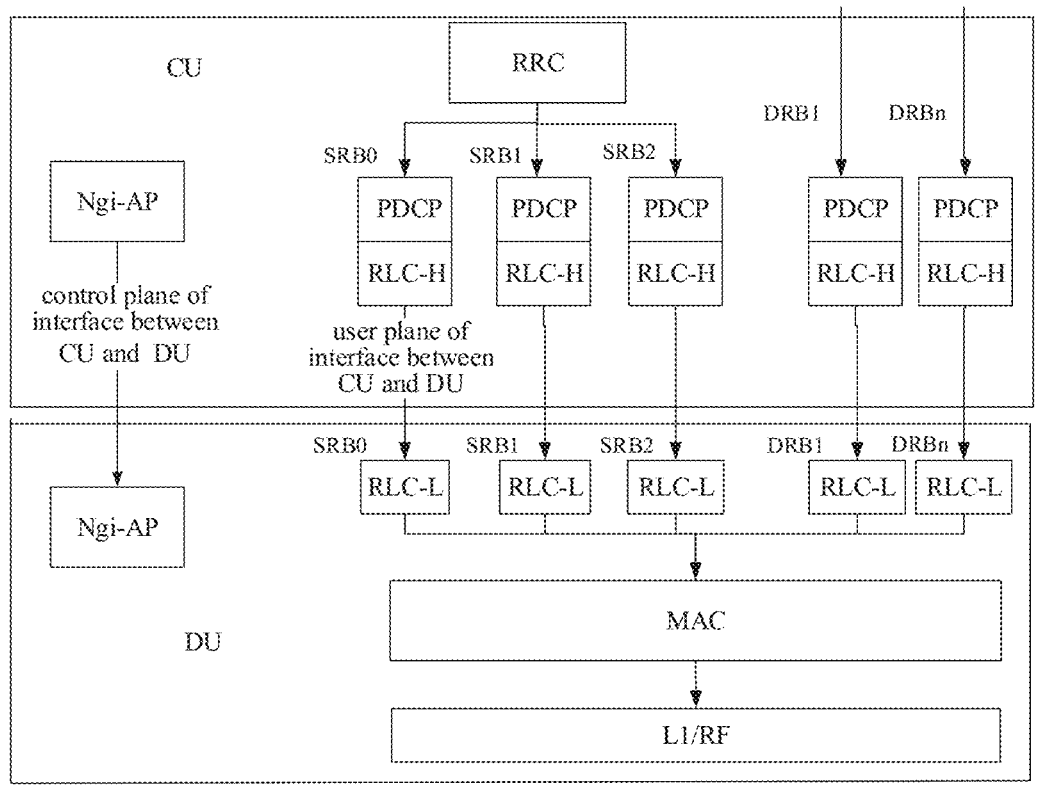
FIG. 8 is a schematic diagram I of a specific implementation architecture of a method for transmitting a radio resource control (RRC) message according to some embodiments of the present disclosure.

Taking Option 3 as an example, such a solution can be implemented using the architecture shown in FIG. 8, wherein Ngi represents an interface between a CU and a DU, SRB represents a signaling radio bearer, SRB0 represents a signaling radio bearer 0, SRB1 represents signaling radio bearer 1, . . . SRBn represents a signaling radio bearer n; DRB represents data radio bearer, DRB0 represents data radio bearer 0, DRB1 represents data radio bearer 1, . . . DRBn represents data radio bearer n; and L1 represents a layer 1.

The second solution is that the PDCP PDU or the RLC PDU corresponding to the RRC message is included in the interface application protocol layer (AP) message in the form of a container, and is transmitted through the interface control plane of the CU and the DU. At the same time, the message carries the transmission time and the logical channel identifier of the RRC message.

Specifically, in the CU, the RRC message is mapped into the corresponding layer 2 data stream-PDCP data or RLC data (e.g., if the CU includes the RLC layer, the RRC message needs to generate the corresponding RLC PDU, and, if not, the PDCP PDU is generated).

The CU incorporates the data stream (assembled) in the interface AP message between the CU and the DU in the form of a container, and at the same time, the AP message carries the effective time and the logical channel identifier of the RRC message, which is transmitted through the control plane.

The DU distributes the data stream to entities of the corresponding layer 2 or layer 1, continues to process the data and sends the same to the UE at the corresponding time. Since the control plane adopts SCTP protocol stack, reliability of the data transmission is guaranteed.

Figure 9:
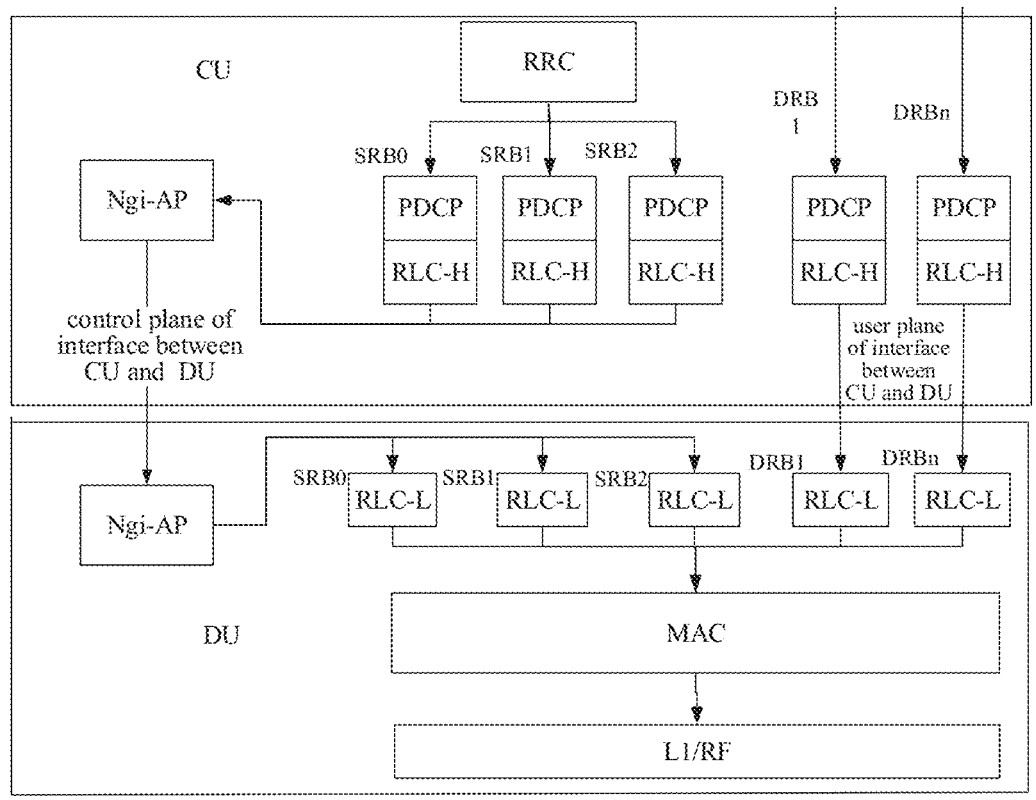
FIG. 9 is a schematic diagram II of a specific implementation architecture of a method for transmitting a radio resource control (RRC) message according to some embodiments of the present disclosure.

Taking the Option 3 as an example, this solution can be implemented by using the architecture shown in FIG. 9, wherein Ngi represents an interface between a CU and a DU, SRB represents a signaling radio bearer, SRB0 represents a signaling radio bearer 0, and SRB1 represents a signaling radio bearer 1, . . . SRBn represents a signaling radio bearer n; DRB represents a data radio bearer, DRB0 represents a data radio bearer 0, DRB1 represents a data radio bearer 1, . . . DRBn represents data radio bearer n; and L1 represents a layer 1.

Specific examples are provided below for the above two solutions in combination with the Option 2 or Option 3.

Example 1: Separation between the CU and the DU adopts the Option 2 (that is, RRC and PDCP are in the CU, RLC, MAC, physical layer and RF are in the DU), in combination with the first solution;

In the CU, the RRC layer sends the data to the corresponding PDCP entity.

The PDCP entity generates PDCP PDU corresponding to the RRC message, and the PDCP PDU as generated is transmitted to the DU through the user plane, wherein the PDCP PDU is a payload part of user plane data, and at the same time, the effective time and the logical channel identifier of the RRC message are added in the GTP-U header.

The DU sends the PDCP PDU as received to the corresponding RLC entity, and to the UE through the MAC, the physical layer and the radio frequency at the corresponding time.

Example 2: The separation between the CU and the DU adopts the Option 3 (that is, the RRC, PDCP, and high layer of the RLC are in the CU, and lower layer of the RLC, the MAC, the physical layer, and the RF are in the DU), in combination with the first solution;

In the CU, the RRC layer sends the data to the corresponding PDCP entity, and the PDCP generates PDCP PDU to be sent to the RLC high layer entity.

The RLC PDU generated by the RLC high layer entity is transmitted through the user plane, wherein the RLC PDU is a payload part of the user plane data, and at the same time, the effective time and the logical channel identifier of the RRC message are added in the GTP-U header.

The DU sends the RLC PDU as received to the corresponding RLC low layer entity, and to the UE through the MAC, the physical layer, and the radio frequency at the corresponding time.

Example 3: The separation between the CU and the DU adopts the Option 2 (that is, the RRC and the PDCP are in the CU, and the RLC, the MAC, the physical layer, and the RF are in the DU), in combination with the second solution; and in the CU, the RRC layer sends the data to the corresponding PDCP entity.

The PDCP entity generates a PDCP PDU corresponding to the RRC message, and the PDCP entity sends the PDCP PDU corresponding to the RRC message to the interface AP between the CU and the DU; the interface AP assembles an interface message between the CU and the DU, which interface message includes the PDCP PDU corresponding to the RRC message and the transmission time and the logical channel identifier of the RRC message.

The CU sends the interface message to the DU through the control plane.

The DU sends the PDCP PDU in the received interface message to the corresponding RLC entity, and to the UE through the MAC, the physical layer and the radio frequency at the corresponding time.

Example 4: The separation between the CU and the DU adopts the Option 3 (that is, the RRC, the PDCP, and the high layer of the RLC are in the CU, and the lower layer of the RLC, the MAC, the physical layer, and the RF are in the DU), in combination with the second solution; and in the CU, the RRC layer sends the data to the corresponding PDCP entity.

The PDCP entity generates a PDCP PDU corresponding to the RRC message, the PDCP entity sends the PDCP PDU to the high layer of the RLC to generate a RLC PDU, and then sends the RLC PDU to the interface AP between the CU and the DU, and the interface AP assembles an interface message between the CU and the DU, which interface message includes the RLC PDU corresponding to the RRC message and the transmission time and the logical channel identifier of the RRC message.

The CU sends the interface message to the DU through the control plane.

The DU sends the RLC PDU in the received interface message to the corresponding RLC low layer entity, and to the UE through the MAC, the physical layer and the radio frequency at the corresponding time.

As can be seen from the above, some embodiments of the present disclosure mainly provide two solutions to solve the above technical problems:

The first solution is to use an AP between the CU and the DU to transmit the PDCP PDU or the RLC PDU corresponding to the RRC message and the effective time and the logical channel identifier of the RRC message to ensure reliability of transmission of the RRC message.

Specifically, a new AP is defined between the CU and the DU so as to transmit a PDCP PDU or a RLC PDU corresponding to the RRC message and an effective time and a logical channel identifier of the RRC message;

in the CU, the RRC message is mapped into the corresponding layer 2 data stream (e.g., if the CU includes the RLC layer, the RRC message needs to generate the corresponding RLC PDU), and then the data stream is transmitted to the DU through the interface AP between the CU and the DU; and in the DU, after receipt of the interface message of the container containing the data stream corresponding to the RRC message, the data in the container is transferred to entities of the corresponding layer 2 or layer 1, and the data continues to be processed and is sent to the UE at the corresponding effective time.

In the second solution, the PDCP PDU or the RLC PDU corresponding to the RRC message is transmitted through the user plane of the CU and the DU, and at the same time, the transmission time and the logical channel identifier of the message are carried in the GTP-U header of the user plane protocol stack.

Specifically, in the CU, the RRC message is mapped into the corresponding layer 2 data stream (e.g., if the CU includes the RLC layer, the RRC message needs to generate the corresponding RLC PDU);

the data stream is transmitted through the user plane, and at the same time, the effective time and the logical channel identifier of the RRC message are added in the GTP-U header; and after receiving the data, the DU continues to process the data and send it to the UE at the corresponding time.

In summary, some embodiments of the present disclosure provide a method for transmitting a RRC message through a user plane or a control plane of an interface between a CU and a DU, thereby ensuring correct data transmission.

Figure 10:
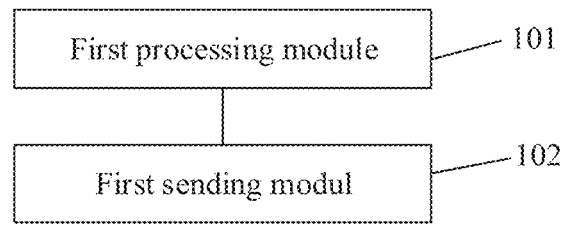
FIG. 10 is a schematic structural diagram of a network side central unit according to some embodiments of the present disclosure.

As shown in FIG. 10, some embodiments of the present disclosure provide a network side central unit (CU), including:

a first processing module 101 configured to map a radio resource control (RRC) message into a data stream of a level corresponding to a user plane; and a first sending module 102 configured to send effective time and a logical channel identifier of the RRC message and the data stream to a corresponding network side distributed unit (DU) through the user plane or a control plane.

In the network side central unit (CU) provided in some embodiments of the present disclosure, the radio resource control (RRC) message is mapped into the data stream of a level corresponding to the user plane, and the effective time and the logical channel identifier of the RRC message and the data stream are sent to the corresponding network side distributed unit (DU) through the user plane or a control plane. As such, the transmission mode of the RRC message in the architecture where the CU and the DU are separated is specified in the 5G system, thereby ensuring correct data transmission.

Two specific solutions are provided for the transmission through the user plane and the control plane respectively.

As a first solution, with respect to the transmission through the user plane, the first sending module includes: a first adding submodule configured to add the effective time and the logical channel identifier of the RRC message in a point-to-point tunneling protocol GTP-U header; and a first sending submodule configured to send the GTP-U header and the data stream to the corresponding network side distributed unit (DU) through the user plane.

As a second solution, with respect to the transmission through the control plane, the first sending module includes: a second sending submodule, configured to send the data stream to an interface application protocol layer (AP) between the CU and the DU; a first assembling submodule configured to assemble, with the interface AP, an interface message including the effective time and the logical channel identifier of the RRC message and the data stream; and a third sending submodule, configured to send the interface message to the corresponding network side distributed unit (DU) through the control plane.

Specifically, the first assembling submodule includes: a first processing unit configured to incorporate the data stream in the interface message, in the form of a container.

With regard to various instances where the DC is separated from the CU, some embodiments of the present disclosure provides two specific solutions with respect to the first processing module 101:

As a first solution, in the case where the RRC and the PDCP are in the CU, and the RLC, the MAC, the physical layer and the RF are in the DU, the first processing module includes: a fourth sending submodule configured to send the RRC message to a corresponding packet data convergence protocol (PDCP) entity; and a first processing submodule configured to generate, with the PDCP entity, PDCP layer protocol data corresponding to the RRC message, wherein the data stream is formed by the PDCP layer protocol data.

As a second solution, in the case where the RRC, the PDCP and high layer of the RLC are in the CU, and low layer of the RLC, the MAC, the physical layer and the RF are in the DU, the first processing module includes: a fifth sending submodule configured to send the RRC message to a corresponding packet data convergence protocol PDCP entity; a second processing submodule configured to generate, with the PDCP entity, PDCP layer protocol data corresponding to the RRC message;

a sixth sending submodule configured to send the PDCP layer protocol data to a corresponding radio link control protocol (RLC) high layer entity; and a third processing submodule configured to generate, with the RLC high layer entity, RLC layer protocol data corresponding to the PDCP layer protocol data, wherein the data stream is formed by the RLC layer protocol data.

As can be known from the above, some embodiments of the present disclosure provide a solution for addressing how the RRC message is specifically transmitted in the case where the CU is separated from the DU in the 5G system, which guarantees correct data transmission, and solves the problem that the data cannot be correctly transmitted in the case where the CU is separated from the DU in the 5G system in the related art.

The foregoing implemented embodiments relating to the method for transmitting the radio resource control (RRC) message on the CU side are applicable to the embodiment of the network side central unit (CU), for which the same technical effects can be achieved.

Figure 11:
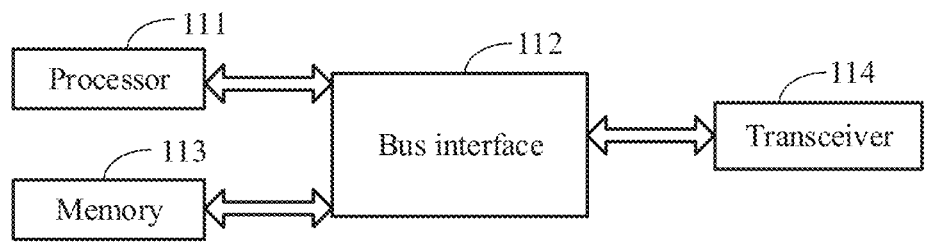
FIG. 11 is a schematic structural diagram of a network side central unit according to some embodiments of the present disclosure.

As shown in FIG. 11, some embodiments of the present disclosure provide a network side central unit (CU), including:

a processor 111; and a memory 113 connected to the processor 111 via a bus interface 112, wherein the memory 113 is configured to store programs and data used by the processor 111 when performing operations, and the processor 111, when calling and executing the programs and data stored in the memory 113, performs the following process:

mapping a radio resource control (RRC) message into a data stream of a level corresponding to a user plane; and sending, by a transceiver 114, effective time and a logical channel identifier of the RRC message and the data stream to a corresponding network side distributed unit (DU) through the user plane or a control plane.

The transceiver 114 is connected to the bus interface 112 for receiving and transmitting data under the control of the processor 111.

It should be noted that in FIG. 11, the bus architecture may include any quantity of interconnected buses and bridges, and specifically links one or more processors represented by the processor 111 and various circuits of a memory represented by the memory 113 together. The bus architecture may also link various other circuits together, such as peripherals, voltage regulators, and power management circuits, which are well known in the art. Therefore, they will not be further described herein. The bus interface provides an interface. The transceiver 114 could be a plurality of elements, that is, including a transmitter and a transceiver, providing units for communicating with various other devices on a transmission medium. The processor 111 is responsible for managing the bus architecture and the normal processing, and the memory 113 can store data used by the processor 111 when performing operations.

It could be understood by those skilled in the art that all or part of the steps of implementing the above embodiments may be implemented by hardware, and may also be completed by a computer program instructing related hardware, which computer program includes instructions for executing part or all of the above steps. In addition, the computer program can be stored in a readable storage medium, which can be storage medium in any form.

Figure 12:
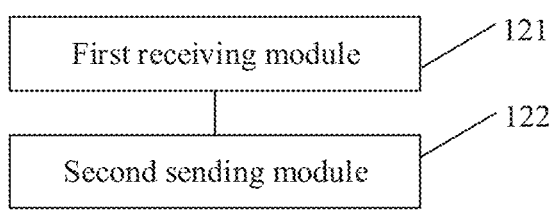
FIG. 12 is a schematic structural diagram of a network side distributed unit according to some embodiments of the present disclosure.

As shown in FIG. 12, some embodiments of the present disclosure provide a network side distributed unit (DU), including:

a first receiving module 121 configured to receive effective time and a logical channel identifier of a RRC message and a data stream sent by a network side central unit (CU); and a second sending module 122 configured to send the data stream to a corresponding user equipment according to the effective time and the logical channel identifier.

In the network side distributed unit (DU) provided by some embodiments of the present disclosure, effective time and a logical channel identifier of the RRC message and a data stream sent by a network side central unit (CU) are received, and the data stream to a corresponding user equipment is sent according to the effective time and the logical channel identifier. As such, the transmission mode of the RRC message in the architecture where the CU is separated from the DU is specified in the 5G system, thereby ensuring correct data transmission.

Two specific solutions are provided for the transmission through the user plane and the control plane respectively:

As a first solution, with respect to the transmission through the user plane, the first receiving module includes: a first receiving submodule configured to receive a point-to-point tunneling protocol GTP-U header and the data stream sent by the CU through a user plane, wherein the GTP-U header includes the effective time and the logical channel identifier of the RRC message.

As a second solution, with respect to the transmission through the control plane, the first receiving module includes: a second receiving submodule configured to receive an interface application protocol layer (AP) message between the CU and the DU sent by the CU through a control plane, wherein the interface AP message includes the effective time and the logical channel identifier of the RRC message and the data stream.

Specifically, the second receiving module includes: a seventh sending submodule configured to send the data stream to a corresponding entity for preset processing; and an eighth sending submodule configured to send the processed data stream to the corresponding user equipment according to the effective time and the logical channel identifier.

With respect to various instances where the DC is separated from the CU, some embodiments of the present disclosure provides two specific solutions for the seventh sending submodule:

As a first solution, in the case where the RRC and the PDCP are in the CU, and the RLC, the MAC, the physical layer and the RF are in the DU, that is, when the data stream is formed by packet data convergence protocol (PDCP) layer protocol data, the seventh sending submodule includes: a second processing unit configured to send the data stream to a corresponding radio link control protocol (RLC) entity, and obtain the processed data stream through a medium access control protocol (MAC) layer, a physical layer, and radio frequency processing.

As a second solution, in the case where the RRC, the PDCP and high layer of the RLC are in the CU, and low layer of the RLC, the MAC, the physical layer and the RF are in the DU, that is, when the data stream is formed by radio link control protocol (RLC) layer protocol data, the seventh sending submodule includes: a third processing unit configured to send the data stream to a corresponding RLC low layer entity, and obtain the processed data stream through a medium access control protocol (MAC) layer, a physical layer, and radio frequency processing.

As can be known from the above, some embodiments of the present disclosure provide a solution for addressing how the RRC message is specifically transmitted in the case where the CU is separated from the DU in the 5G system, which guarantees correct data transmission, and solves the problem that the data cannot be correctly transmitted in the case where the CU is separated from the DU in the 5G system in the related art.

The foregoing implemented embodiments of the method for transmitting the radio resource control (RRC) message on the DU side are applicable to the embodiments of the network side distributed unit (DU), for which the same technical effects can be achieved.

Figure 13:
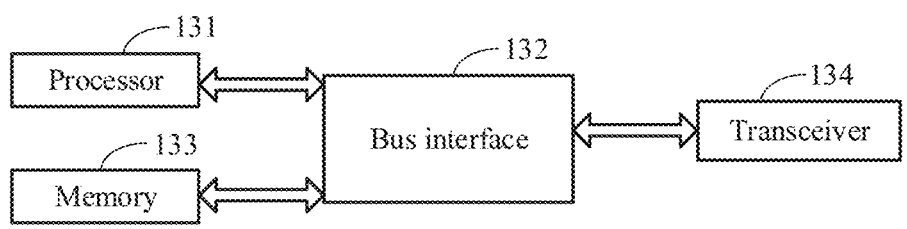
FIG. 13 is a schematic structural diagram of a network side distributed unit according to some embodiments of the present disclosure.

As shown in FIG. 13, some embodiments of the present disclosure provide a network side distributed unit (DU), including:

a processor 131; and a memory 133 connected to the processor 131 via a bus interface 132, wherein the memory 133 is configured to store programs and data used by the processor 131 when performing operations, and the processor 131, when calling and executing the programs and data stored in the memory 133, performs the following process:

receiving, by a transceiver 134, effective time and a logical channel identifier of a RRC message and a data stream sent by a network side central unit (CU); and sending, by the transceiver 134, the data stream to a corresponding user equipment according to the effective time and the logical channel identifier.

The transceiver 134 is connected with the bus interface 132 for receiving and transmitting data under the control of the processor 131.

It should be noted that in FIG. 13, the bus architecture may include any quantity of interconnected buses and bridges, and specifically links one or more processors represented by the processor 131 and various circuits of a memory represented by the memory 133 together. The bus architecture may also link various other circuits together, such as peripherals, voltage regulators, and power management circuits, which are well known in the art. Therefore, they will not be further described herein. The bus interface provides an interface. The transceiver 134 could be a plurality of elements, that is, including a transmitter and a transceiver, providing units for communicating with various other devices on a transmission medium. The processor 131 is responsible for managing the bus architecture and the normal processing, and the memory 133 can store data used by the processor 131 when performing operations.

It could be understood by those skilled in the art that all or part of the steps of implementing the above embodiments may be implemented by hardware, and may also be completed by a computer program instructing related hardware, which computer program includes instructions for executing part or all of the above steps. In addition, the computer program can be stored in a readable storage medium, which can be storage medium in any form.

Many of the functional components described in this specification are referred to as modules/sub-modules/units to more particularly emphasize the independence of their implementation.

In embodiments of the present disclosure, modules/sub-modules/units may be implemented in software for execution by various types of processors. For example, an identified executable code module may include one or more physical or logical blocks of computer instructions, which can be constructed, for example, as an object, a procedure, or a function. Nonetheless, the executable codes of the identified modules are not required to be physically located together, but may include different instructions stored at different bits. When logically combined, these instructions constitute a module and implement a specified purpose of the module.

In practice, the executable code module can be a single instruction or a plurality of instructions, and may even be distributed across multiple different code segments, distributed in different programs, and distributed across multiple storage devices. Likewise, operational data may be identified within the modules and may be implemented in any suitable form and organized within any suitable type of data structure. The operational data may be collected as a single data set, or may be distributed at different locations (including on different storage devices), and may at least partially exist in a system or network as an electronic signal.

When the module can be implemented by software, considering the level of the hardware process in the related art, the module can be implemented in software, and those skilled in the art can construct the corresponding hardware circuit to realize the corresponding function without the need for considering the cost. The hardware circuit includes conventional Very Large Scale Integration (VLSI) circuits or gate arrays and related art semiconductors such as logic chips, transistors, or other discrete components. The modules can also be implemented with programmable hardware devices such as field programmable gate arrays, programmable array logic, programmable logic devices, and the like.

Described above are preferred embodiments of the present disclosure, and it should be noted that those skilled in the art can also make several improvements and modifications without departing from the principles of the present disclosure, which will also fall within the scope of protection of the present disclosure.

What is claimed is:

1. A method for transmitting a radio resource control (RRC) message, applied to a network side central unit (CU), comprising: mapping the radio resource control (RRC) message into a data stream of a level corresponding to a user plane; and sending effective time and a logical channel identifier of the RRC message and the data stream to a corresponding network side distributed unit (DU) through the user plane or a control plane.

2. The method according to claim 1, wherein the step of sending effective time and a logical channel identifier of the RRC message and the data stream to a corresponding network side distributed unit (DU) through the user plane comprises:
adding the effective time and the logical channel identifier of the RRC message in a point-to-point tunneling protocol, GPRS tunneling protocol user plane (GTP-U) header; and
sending the GTP-U header and the data stream to the corresponding network side distributed unit (DU) through the user plane.

3. The method according to claim 1, wherein the step of sending effective time and a logical channel identifier of the RRC message and the data stream to a corresponding network side distributed unit (DU) through a control plane comprises:
sending the data stream to an interface application protocol layer (AP) between the CU and the DU; assembling an interface message comprising the effective time and the logical channel identifier of the RRC message and the data stream by the interface AP; and
sending the interface message to the corresponding network side distributed unit (DU) through the control plane.

4. The method according to claim 3, wherein the step of assembling an interface message comprising the effective time and the logical channel identifier of the RRC message and the data stream by the interface AP comprises:
incorporating the data stream in the interface message, in the form of a container.

5. The method according to any one of claim 1, wherein the step of mapping the radio resource control (RRC) message into a data stream of a level corresponding to a user plane comprises:
sending the RRC message to a corresponding packet data convergence protocol (PDCP) entity; and generating, with the PDCP entity, PDCP layer protocol data corresponding to the RRC message, wherein the data stream is formed by the PDCP layer protocol data.

6. The method according to any one of claim 1, wherein the step of mapping the radio resource control (RRC) message into a data stream of a level corresponding to a user plane comprises:
sending the RRC message to a corresponding packet data convergence protocol (PDCP) entity; generating, with the PDCP entity, PDCP layer protocol data corresponding to the RRC message; sending the PDCP layer protocol data to a corresponding radio link control protocol (RLC) high layer entity; and generating, with the RLC high layer entity, RLC layer protocol data corresponding to the PDCP layer protocol data, wherein the data stream is formed by the RLC layer protocol data.

7. A method for transmitting a radio resource control (RRC) message, applied to a network side distributed unit (DU), comprising:
receiving effective time and a logical channel identifier of the RRC message and a data stream sent by a network side central unit (CU); and
sending the data stream to a corresponding user equipment according to the effective time and the logical channel identifier.

8. The method according to claim 7, wherein the step of receiving effective time and a logical channel identifier of the RRC message and a data stream sent by a network side central unit (CU) comprises:
receiving a point-to-point tunneling protocol, GPRS tunneling protocol user plane (GTP-U) header; and the data stream sent by the CU through a user plane, wherein the GTP-U header comprises the effective time and the logical channel identifier of the RRC message.

9. The method according to claim 7, wherein the step of receiving effective time and a logical channel identifier of the RRC message and a data stream sent by a network side central unit (CU) comprises:
receiving an interface application protocol layer (AP) message between the CU and the DU sent by the CU through a control plane, wherein the interface AP message comprises the effective time and the logical channel identifier of the RRC message and the data stream.

10. The method according to any one of claim 7, wherein the step of sending the data stream to a corresponding user equipment according to the effective time and the logical channel identifier comprises:
sending the data stream to a corresponding entity for preset processing; and
sending the processed data stream to the corresponding user equipment according to the effective time and the logical channel identifier.

11. The method according to claim 10, wherein when the data stream is formed by packet data convergence protocol (PDCP) layer protocol data, the step of sending the data stream to a corresponding entity for preset processing comprises:
sending the data stream to a corresponding radio link control protocol (RLC) entity, and obtaining the processed data stream through a medium access control protocol (MAC) layer, a physical layer and radio frequency processing.

12. The method according to claim 10, wherein when the data stream is formed by radio link control protocol (RLC) layer protocol data, the step of sending the data stream to a corresponding entity for preset processing comprises:
sending the data stream to a corresponding RLC low layer entity, and obtaining the processed data stream through a medium access control protocol (MAC) layer, a physical layer and radio frequency processing.

13. A network side distributed unit (DU), comprising a processor, a transceiver, and a memory;

wherein the processor is configured to read a program in the memory to perform the method according to claim 7;

the transceiver is configured to receive and transmit data; and the memory is configured to store data used by the processor when performing operations.

14. The network side distributed unit (DU) according to claim 13, wherein the receiving effective time and a logical channel identifier of the RRC message and a data stream sent by a network side central unit (CU) comprises:
receiving a point-to-point tunneling protocol, GPRS tunneling protocol user plane (GTP-U) header; and the data stream sent by the CU through a user plane, wherein the GTP-U header comprises the effective time and the logical channel identifier of the RRC message; or, receiving an interface application protocol layer (AP) message between the CU and the DU sent by the CU through a control plane, wherein the interface AP message comprises the effective time and the logical channel identifier of the RRC message and the data stream;

wherein the sending the data stream to a corresponding user equipment according to the effective time and the logical channel identifier comprises:
sending the data stream to a corresponding entity for preset processing, and sending the processed data stream to the corresponding user equipment according to the effective time and the logical channel identifier.

15. The network side distributed unit (DU) according to claim 14, wherein when the data stream is formed by packet data convergence protocol (PDCP) layer protocol data, the sending the data stream to a corresponding entity for preset processing comprises:
sending the data stream to a corresponding radio link control protocol (RLC) entity, and obtaining the processed data stream through a medium access control protocol (MAC) layer, a physical layer and radio frequency processing;
wherein when the data stream is formed by radio link control protocol (RLC) layer protocol data, the sending the data stream to a corresponding entity for preset processing comprises:
sending the data stream to a corresponding RLC low layer entity, and obtaining the processed data stream through a medium access control protocol (MAC) layer, a physical layer and radio frequency processing.

16. A network side central unit (CU), comprising a processor, a transceiver, and a memory;
wherein the processor is configured to read a program in the memory to perform the following process:
mapping a radio resource control (RRC) message into a data stream of a level corresponding to a user plane;
sending effective time and a logical channel identifier of the RRC message and the data stream to a corresponding network side distributed unit (DU) through the user plane or a control plane;

the transceiver is configured to receive and transmit data; and
the memory is configured to store data used by the processor when performing operations.

17. The network side central unit (CU) according to claim 16, wherein the sending effective time and a logical channel identifier of the RRC message and the data stream to a corresponding network side distributed unit (DU) through the user plane comprises:
adding the effective time and the logical channel identifier of the RRC message in a point-to-point tunneling protocol, GPRS tunneling protocol user plane (GTP-U) header; and
sending the GTP-U header and the data stream to the corresponding network side distributed unit (DU) through the user plane.

18. The network side central unit (CU) according to claim 16, wherein the sending effective time and a logical channel identifier of the RRC message and the data stream to a corresponding network side distributed unit (DU) through a control plane comprises:
sending the data stream to an interface application protocol layer (AP) between the CU and the DU;
assembling an interface message comprising the effective time and the logical channel identifier of the RRC message and the data stream by the interface AP; and
sending the interface message to the corresponding network side distributed unit (DU) through the control plane.

19. The network side central unit (CU) according to claim 18, wherein the assembling an interface message comprising the effective time and the logical channel identifier of the RRC message and the data stream by the interface AP comprises:
incorporating the data stream in the interface message, in the form of a container.

20. The network side central unit (CU) according to claim 16, wherein the mapping the radio resource control (RRC) message into a data stream of a level corresponding to a user plane comprises:
sending the RRC message to a corresponding packet data convergence protocol (PDCP) entity, and generating, with the PDCP entity, PDCP layer protocol data corresponding to the RRC message, wherein the data stream is formed by the PDCP layer protocol data; or,
sending the RRC message to a corresponding packet data convergence protocol (PDCP) entity, generating, with the PDCP entity, PDCP layer protocol data corresponding to the RRC message, sending the PDCP layer protocol data to a corresponding radio link control protocol (RLC) high layer entity, and generating, with the RLC high layer entity, RLC layer protocol data corresponding to the PDCP layer protocol data, wherein the data stream is formed by the RLC layer protocol data.

* * * * *